(12) United States Patent  
Bhatt et al.

(10) Patent No.: US 9,582,902 B2  
(45) Date of Patent: *Feb. 28, 2017

(54) MANAGING RAW AND PROCESSED IMAGE FILE PAIRS

(71) Applicant: Apple Inc., Cupertino, CA (US)

(72) Inventors: Nikhil Bhatt, Cupertino, CA (US); Mark Shackelford, San Jose, CA (US); Mark Lee Kawano, San Mateo, CA (US); Allen Langmaier, San Jose, CA (US)

(73) Assignee: Apple Inc., Cupertino, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 14/146,847

(22) Filed: Jan. 3, 2014

(65) Prior Publication Data

US 2014/0133770 A1 May 15, 2014

Related U.S. Application Data

(63) Continuation of application No. 12/611,060, filed on Nov. 2, 2009, now Pat. No. 8,625,908.

(51) Int. Cl.
*G06K 9/00* (2006.01)
*G06T 9/00* (2006.01)
*G06F 17/30* (2006.01)

(52) U.S. Cl.
CPC ............ *G06T 9/00* (2013.01); *G06F 17/3028* (2013.01)

(58) Field of Classification Search
CPC combination set(s) only.
See application file for complete search history.

(56) References Cited

U.S. PATENT DOCUMENTS

| | | | |
|---|---|---|---|
| 5,867,606 A | 2/1999 | Tretter | |
| 5,987,165 A | 11/1999 | Matsuzaki et al. | |
| 6,300,955 B1 | 10/2001 | Zamir | |
| 7,593,603 B1 | 9/2009 | Wilensky | |
| 7,602,949 B2 | 10/2009 | Simon et al. | |
| 2004/0258308 A1* | 12/2004 | Sadovsky | H04N 1/32128 382/190 |
| 2007/0188510 A1 | 8/2007 | Kokemohr | |
| 2007/0196027 A1* | 8/2007 | Lin | G06T 3/40 382/254 |
| 2007/0245382 A1* | 10/2007 | Doi | H04H 20/30 725/55 |
| 2008/0036864 A1 | 2/2008 | McCubbrey et al. | |
| 2008/0075395 A1 | 3/2008 | Wallace et al. | |

* cited by examiner

*Primary Examiner* — Alex Liew
(74) *Attorney, Agent, or Firm* — Fish & Richardson P.C.

(57) ABSTRACT

Among other things, methods, systems and computer program products are disclosed for managing image files. In one aspect, a method includes displaying, at a data processing device, a preview of images available for import from a storage device, wherein each image is associated with a pair of corresponding image files comprising a compressed image file and a raw image file obtained from a single image capture. At the data processing device, both the raw image file and the compressed image file of the pair associated with at least one of the images are imported. At the data processing device, at least one of the pair of corresponding image files is identified as a master image file for the associated image. At the data processing device, the identified master image file for the associated captured image is displayed.

22 Claims, 15 Drawing Sheets

US 9,582,902 B2

MANAGING RAW AND PROCESSED IMAGE FILE PAIRS

CROSS-REFERENCE TO RELATED APPLICATION

This application is a continuation of U.S. patent application Ser. No. 12/611,060 entitled "Managing Raw and Processed Image File Pairs" filed on Nov. 2, 2009, the entire contents of which is hereby incorporated by reference for all purposes.

BACKGROUND

This application relates to digital image files.

When a user captures an image using a digital camera, for example, this single exposure can result in a pair of image files associated with the captured image. One of the pair is an image file in the raw format, which has not been processed or compressed and thus has all of the original image information available. The second file of the pair is a processed and/or compressed image file that typically has lost some of the pixel information compared to the raw image file. One example of the corresponding pair of image files is the RAW+JPEG pair, where JPEG is a common file format technology used by digital cameras. The RAW image file represents an unprocessed image file that retains all of the originally obtained pixel data. The JPEG image file is a compressed image file that, as a result of the compression, has lost some of the original pixel data of the captured image. The JPEG image file necessarily loses at least some pixel information because standard JPEG compression is lossy.

The JPEG image file may be visibly different from the RAW image file because the JPEG image file has gone through camera processing—for example, white balance processing, data compression and the like. For example, the JPEG image file may look more saturated than the RAW image file. The JPEG image file typically is a result of processing the RAW image by decreasing the dynamic range and performing compression. The resulting JPEG image file is small in size and easy to work with.

The RAW+JPEG pair format can allow a user to obtain two image files from a single exposure (e.g. capturing an image) on a camera device. After shooting a RAW image file on a camera device, a corresponding JPEG image file can be generated at the same time. The RAW+JPEG pair is not obtained from two different exposures in that the shutter of the camera is not fired twice, but rather the image is captured once and saved in the two different formats.

SUMMARY

Methods, systems and computer program products are described for managing RAW+JPEG pairs.

In one aspect, a method includes displaying, at a data processing device, a preview of images available for import from a storage device. Each image is associated with a pair of image files obtained from a single image capture. The image file pair includes a compressed image file and a raw image file. Additionally, the method includes importing, at the data processing device, both the raw image file and the compressed image file of the pair associated with at least one of the images. The method includes receiving user input identifying, at the data processing device, one of the pair of corresponding image files as a master image file for the associated image. Also, the method includes displaying, at the data processing device, the identified master image file for the associated image.

Implementations can optionally include one or more of the following features. The master image file can be displayed to the user to receive user modification of the image file pair through the master image file. Identifying at least one of the pair of corresponding image files as a master image file for the associated image can include presenting a choice to the user to dock the raw image file and the corresponding compressed image file together for the associated image as linked image files or to identify the image files in the pair as independent image files. When the image files in the pair are docked together, one of the linked image files can be identified as the master image file one at a time. When the image files in the pair are independent image files, both image files in the pair can be identified as the master file at the same time. Displaying the identified master image file for the associated image can include displaying one of the linked image files at a time or displaying both of the independent image files at the same time based on the identifying. The compressed image file can include a Joint Photographic Experts Group (JPEG) compatible file. The storage device can be included in a digital camera.

In another aspect, a method can include displaying, at a data processing device, a preview of images available for import from a storage device. Each image is associated with a pair of image files obtained from a single image capture. The image file pair includes a compressed image file and a raw image file. The method includes importing, at the data processing device, the compressed image file of the pair for each imported image. The method includes receiving, at the data processing device, user input adjusting an import setting to identify a corresponding raw image file for at least one of the imported compressed image files. Additionally, the method includes importing, at the data processing device, the corresponding raw image file from the storage device based on the adjusted import setting.

Implementations can optionally include one or more of the following features. The method can include receiving user input applying metadata to at least one of the imported compressed image files. The user input adjusting the import setting can include information to adjust a filter parameter based on the applied metadata. The corresponding raw image file can be automatically identified for at least one of the imported compressed image files based on the filter parameter. Applying the metadata can include creating a file containing the metadata and pointing the created metadata file to both the compressed image file and the corresponding raw image file. The applied metadata can include non-pixel information related to at least one of caption, global positioning satellite (GPS) coordinate, sharpness or white balance. Applying the metadata can include creating a separate file for the raw image file and the compressed image file. Applying the metadata can include applying a rating to the at least one imported compressed image file. Automatically identifying the corresponding raw image file for at least one of the imported compressed image files based on the filter parameter can include searching for raw image files that meet the applied rating; and importing the corresponding raw image files that meet the applied rating. Additionally, the compressed image file can include a Joint Photographic Experts Group (JPEG) compatible file.

In another aspect, a method includes importing, at a data processing device, one of a pair of image files associated with a captured image. The image file pair includes a compressed image file and a raw image file. The method includes receiving user input applying, at the data processing device, an image adjustment to the imported one of the corresponding pair. The method includes identifying, at the data processing device, whether the applied adjustment is designated for automatic association with the both the compressed image file and the raw image file in the image file pair. The method includes associating, at the data processing device, the applied image adjustment to the other file in the image file pair when identifying the applied adjustment as being designated for association with both the compressed image file and the raw image file in the image file pair. Additionally, the method includes displaying, at the data processing device, one or both of the compressed image file and the raw image file in the image file pair associated with the captured image with the applied image adjustment based on the identifying and associating.

Implementations can optionally include one or more of the following features. The compressed image file can include a Joint Photographic Experts Group (JPEG) compatible file. The image adjustment can include metadata generated by the user. The method can include applying the image adjustment to both the compressed image file and the raw image file of the image file pair based on the receiving, identifying and associating. Identifying the applied image adjustment as being designated for association with both the compressed image file and the raw image can include identifying the applied image adjustment as matching one of available image adjustments designated to be applied to both the compressed image file and the raw image file. The available image adjustments designated to be applied to both the compressed image file and the raw image file can include at least one of crop, flip or straighten. Identifying the applied image adjustment as being designated for association with both the compressed image file and the raw image can include identifying the applied image adjustment as not matching one of available image adjustments not designated to be applied to both the compressed image file and the raw image file. The available image adjustments not designated to be applied to both the compressed image file and the raw image file comprises at least one of tone or white balance.

In another aspect, a system includes an image management system to import a select image from a storage device. The image management system can include a preview unit to present a choice of images available or import. Each image is associated with a pair of image files obtained from a single image capture. The image file pair includes a compressed image file and a corresponding raw image file. The image management system includes an import unit to import at least one of the available images from the storage device including importing both the raw image file and the corresponding compressed image file of the pair associated with each imported image. The image management system includes an image identification unit to identify the raw image file, the corresponding compressed image file or both files of the pair associated with each imported image to be displayed. The system includes a user input unit to communicate with the image management system. The user input unit is configured to receive a selection of at least one of the available images and a selection of at least one of the pair of files associated with the selected image for display. The system includes a display unit to communicate with the image management system. The display unit is configured to display the selected image file of the pair associated with the imported image based on the received selection.

Implementations can optionally include one or more of the following features. The compressed image file can include a Joint Photographic Experts Group (JPEG) compatible file.

In another aspect, a computer-readable medium embodying instructions, when executed by a processor, causes a data processing device to perform operations including displaying a preview of images available for import from a storage device. Each image is associated with a pair of image files obtained from a single image capture, and the image file pair includes a compressed image file and a raw image file obtained from a single image capture. The operations include importing at least one of the image files available from the storage device that includes importing one of the two files from the pair for each imported image. Importing at least one of the image files includes applying metadata to the imported file from the pair for at least one of the imported image. Importing at least one of the image files includes automatically associating the applied metadata to the other file in the pair. Importing at least one of the image files includes identifying at least one imported image to import the other file in the image file pair based on the applied metadata. Additionally, importing at least one of the image files includes importing the other file in the image file pair for the identified at least one imported image.

Implementations can optionally include one or more of the following features. Importing one of the two files from the corresponding pair for each imported image can include importing the compressed image file; and identifying at least one imported image to import the other file in the pair based on the applied metadata including setting a filter parameter based on the applied metadata. Applying the metadata can include creating a file containing the metadata; and pointing the created metadata file to both the compressed image file and the corresponding raw image file. The applied metadata can include a user rating of the image associated with the imported file. Applying the metadata can include creating a separate file for the raw image file and the compressed image file; and sync the two separate metadata files.

The subject matter described in this specification can potentially provide one or more advantages. For example, managing the RAW+JPEG pairs as described can provide various camera support function. By importing the JPEG files of the corresponding pairs first, the images can be imported faster than importing both file types. Because the JPEG files are smaller in size, due to its compressed nature, JPEG files are easier to adjust. Any adjustments applied to the JPEG files can be automatically attributed or associated with the RAW files of the corresponding pairs. Thus, a user can import one of the two image files from each corresponding pair (e.g., the JPEG file) and import the other file (e.g., RAW file) from the corresponding pair at a later time. Once the JPEG files are imported, metadata, such as user ratings, can be assigned to the imported JPEG files. Then, filter functions can be set to import a subset of all available RAW image files that match the desired metadata information. Also, when viewing the images, the JPEG, the RAW or both image files can be displayed to the user. The displayed files can be deemed to be the master file to be manipulated by the user. Also, both files in the corresponding pair can be displayed separately as two different masters. In this case, both files can be manipulated by the user separately.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

Like reference symbols and designations in the various drawings indicate like elements.

DETAILED DESCRIPTION

Techniques, apparatus, systems and computer program product are described for managing RAW+JPEG pairs associated with each image file captured from a digital camera device, for example. Managing the RAW+JPEG pairs can include selectively importing the RAW and JPEG images from the pairs by adjusting the import settings. The imported RAW+JPEG pairs can be displayed with the RAW, the JPEG or both image files designated as the master image file. The designated and displayed master image file can be modified by the user.

Selecting RAW or JPEG as Master When Importing Images

Figure 1A:
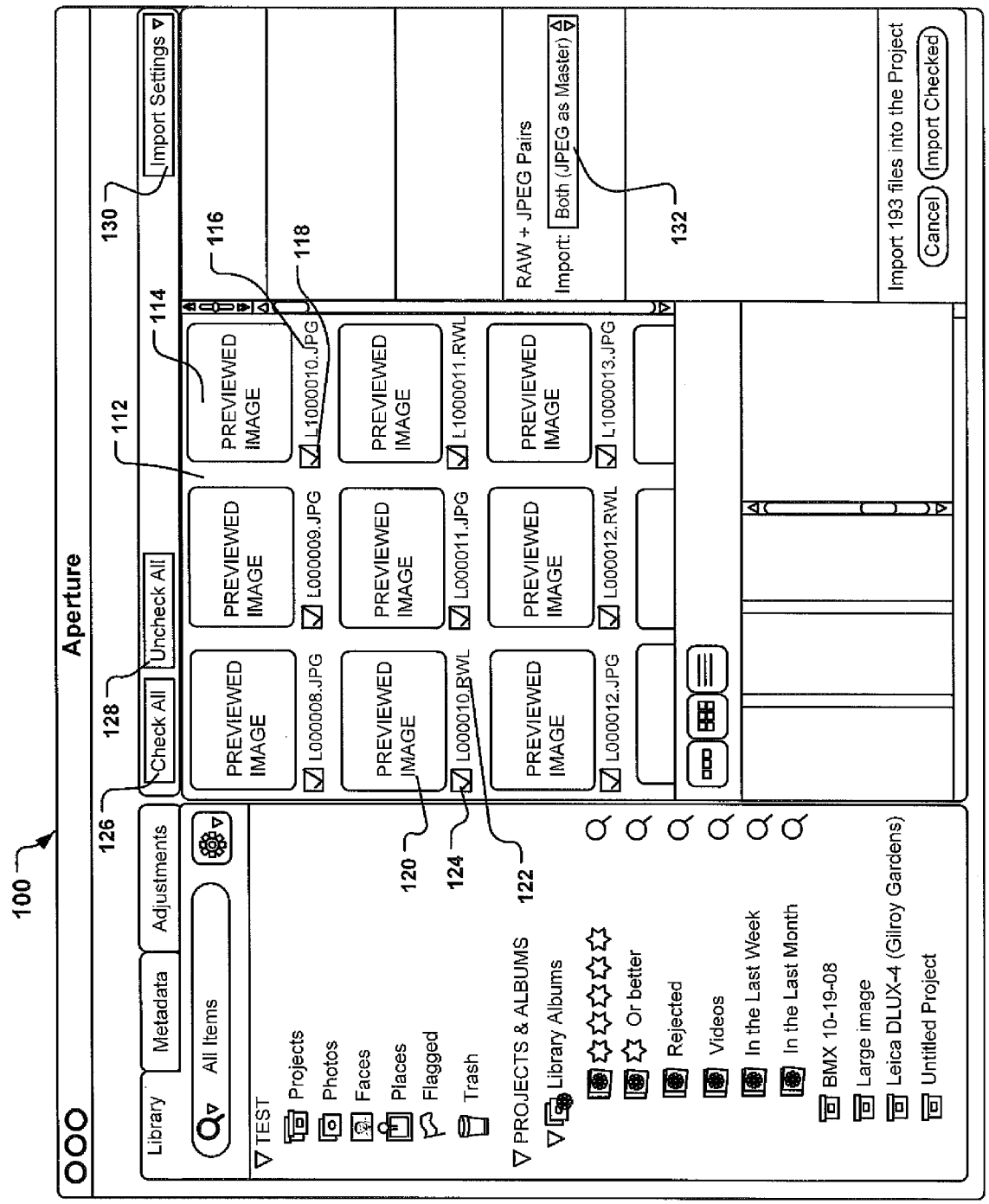
FIG. 1A shows an example graphical user interface (GUI) (100) for importing one or more images from a data repository, such as a memory or storage device on a digital camera.

FIG. 1A shows an example graphical user interface (GUI) (100) that can be used to import one or more images from a data repository, such as a memory or storage device on a digital camera. The GUI (100) can include an image preview area (112) for previewing the image files available for import. Each previewed image file (e.g., 114 or 120) can include a file name (e.g., 116 or 122) and a visual indicator (e.g., 118 or 124) for selecting the previewed image file. The file name (e.g., 116 or 122) displayed with the corresponding previewed image file (e.g., 114 or 120) can indicate whether the previewed image is a RAW image file (e.g., 120, "RWL") or a JPEG (e.g., processed) image file (e.g., 114, "JPG"). The visual indicator (e.g., 118 or 124) for selecting the previewed image file can include a user-selectable interface, such as a box that can be checked to select the corresponding image file. Other user-selectable interface can be used to select the corresponding image file, including a radio button, a box that can be "x-ed," etc. Also, the previewed image file or the displayed file name can be highlighted to visually indicate that the corresponding image file has been selected.

The GUI (100) can also include a user interface for selecting or unselecting all of the previewed image files (e.g., 126, 128). For example, a user-selectable button can be implemented to automatically select (e.g., 126 to check a box) all of the previewed image files at once. Also, a user selectable button can be implemented to automatically unselect (e.g., 128 to uncheck a box) all of the previewed image files at once.

The GUI (100) can include a user interface for adjusting the import settings (130). The user interface for adjusting the import settings (130) can include a user interface that can provide different options for importing the RAW+JPEG pair (132). For example, the import settings can be adjusted to import both the RAW image file and the JPEG image file together with the JPEG image file designated as the master image file. The master image file is displayed to the user, and the user can apply adjustments, metadata, etc. to the master image file. By adjusting the import settings, both the RAW image file and the JPEG image file from the corresponding RAW+JPEG pair can be imported together with the RAW image file as the master. The import settings can be adjusted to import the JPEG image file from the selected RAW+JPEG pair(s) without importing the corresponding RAW image file. Also, the import settings can be adjusted to import the RAW image file from the selected RAW+JPEG pair(s) without importing the corresponding JPEG image file. In addition, the import settings can be adjusted to import both the RAW image file and the corresponding JPEG image file together with each image file designated as a separate master file.

When the two image files in the corresponding RAW+JPEG pair are linked together, either one of the two files can be selected as the master file. For example, the import settings can be adjusted to import both files with the JPEG image file selected as the master file. Alternatively, the import settings can be adjusted to import both image files with the RAW image file selected as the master file.

Figure 1B:
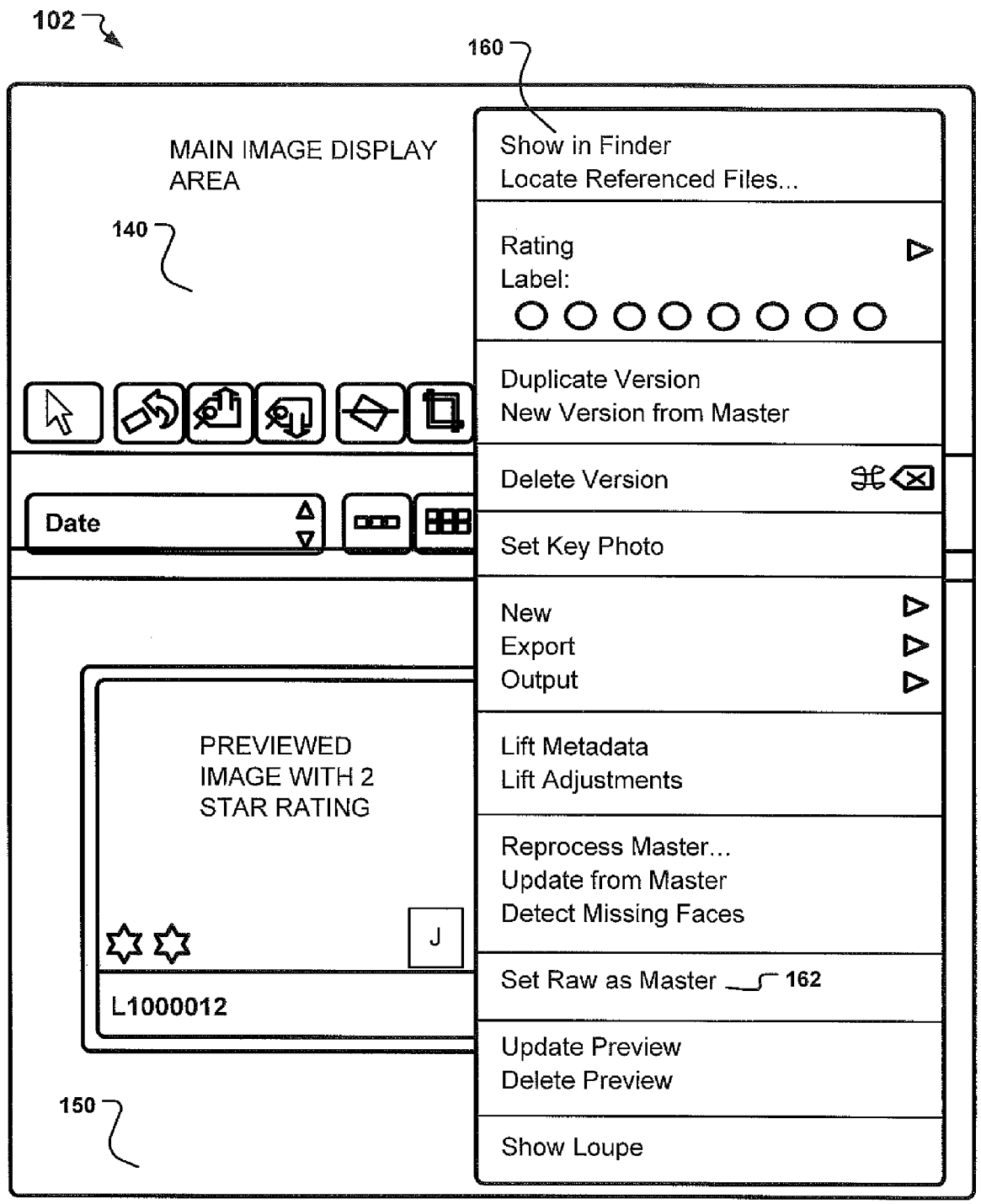
FIG. 1B shows a GUI for presenting operations available for imported image files.

When one of the two image files from the corresponding RAW+JPEG pair is selected and displayed as the master file, the other file in the corresponding RAW+JPEG pair is not visible to the user. However, the user can easily switch between the two files in the corresponding RAW+JPEG pair as the master file. For example, FIG. 1B shows a GUI (102) for presenting the available operations for the imported image files. The GUI (102) can include a main image display area (140) and a preview area (150). Also, the GUI (102) shown in FIG. 1B can include a menu (160) for presenting a choice of operations available for the imported image files. The menu (160) can include an option to switch the designated master file (162). In the example shown in FIG. 1B, the JPEG image file is currently set as the master file, as indicated by the letter "J" displayed on the previewed image. The menu (160) presents an option to switch the master file to the RAW image file of the corresponding pair. Also, the menu (160) can include an option to delete the other file in the corresponding pair not visible to the user (in this example, the RAW image file) to save space, for example. The menu (160) can include another option to split the linked image files in the corresponding pair as separate master image files using a menu option named "Separate RAW+JPEG," for example. When the two image files in the corresponding pair are separated, an option can be provided to take the two separate image files of the RAW+JPEG pair and make them a linked pair using a menu option named "Combine RAW+JPEG," for example.

Figure 2:
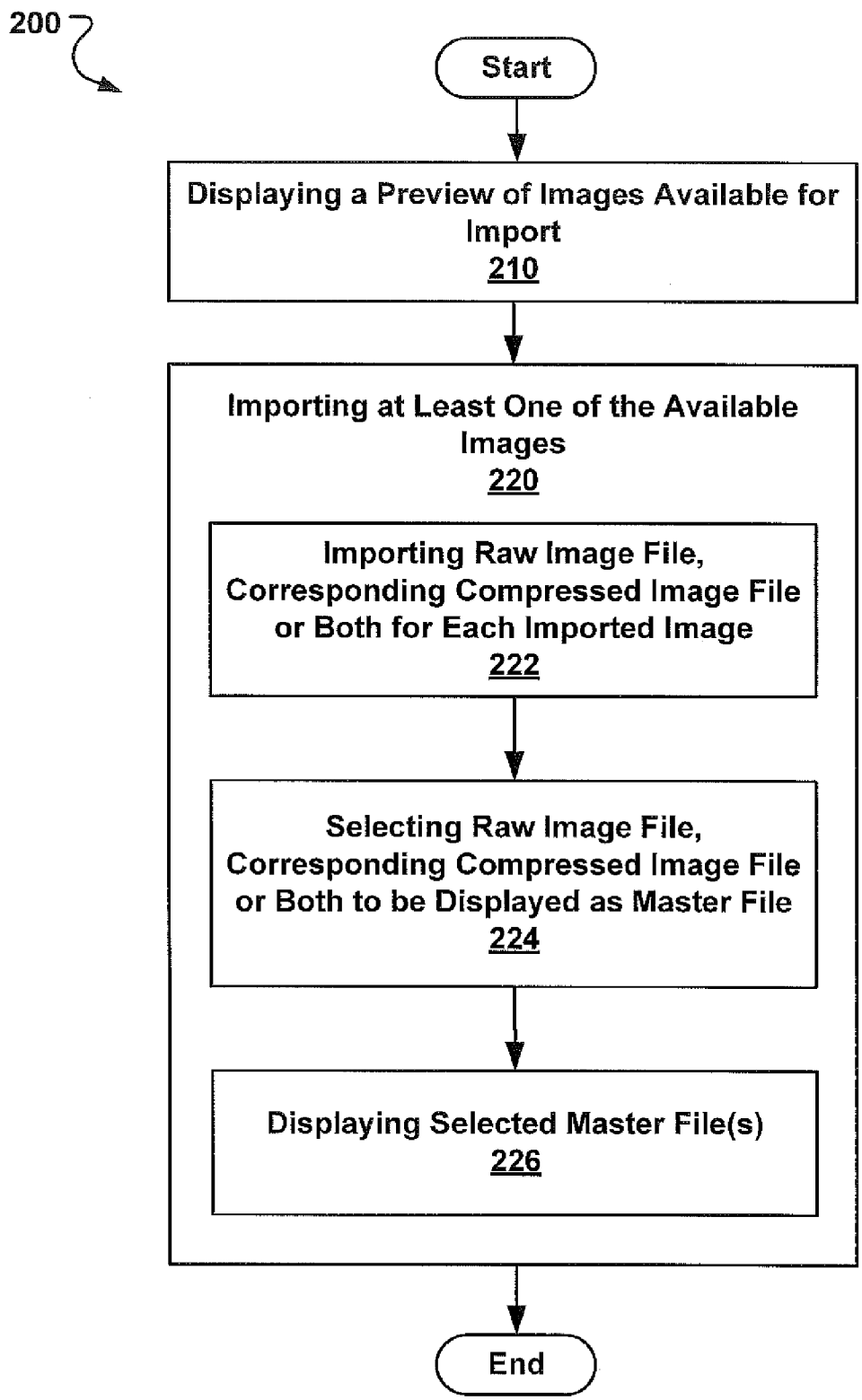
FIG. 2 shows a process for importing one or more RAW+JPEG pairs.

The process for importing one or more RAW+JPEG pairs can be described using a process flow diagram as shown in FIG. 2. A system or an apparatus can implement a GUI (e.g., 100 or 102) to present a preview of image files available for import (210). Using the GUI, one or more of the available image files can be imported based on received user input (220). For example, user input indicating selection of one or more of the available image files can be received using the checked-boxes. Those selected image files can be imported. Importing the image files can include importing the raw image file (e.g., RAW), the corresponding compressed image file (e.g., JPEG) or both from the RAW+JPEG pair (222). When importing the image files, the raw image file, the corresponding compressed image file or both can be selected to be displayed as the master image file (224). The selected master file(s) is displayed to the user using the GUI, for example (226).

As described above, the selected master file(s) from the corresponding RAW+JPEG pair can be displayed to the user, and the user can apply the desired metadata or adjustments to the displayed master file(s). If the applied metadata and adjustments are identified as those that should be associated with the other image file, the metadata and adjustments can be automatically associated with the other image file in the corresponding RAW+JPEG pair. Also, when the RAW image file is linked to the JPEG image file, the applied metadata and adjustments can be automatically associated with the other image file in the corresponding RAW+JPEG pair.

Importing Corresponding RAW Files Using First Imported JPEG files

FIGS. 3A, 3B, 3C, 3D and 3E show example GUIs that illustrate a process for importing RAW+JPEG pairs. Rather than importing both files in the corresponding RAW+JPEG pair, one of the two files can be imported first. The RAW image files are larger in size than the corresponding JPEG files, and thus it may be more efficient, with respect to time and storage space, to import the JPEG files first without the RAW files. From the imported JPEG files, a select number of corresponding RAW image files can be imported. This process can eliminate the need to import all of the RAW image files at the beginning.

Figure 3A:
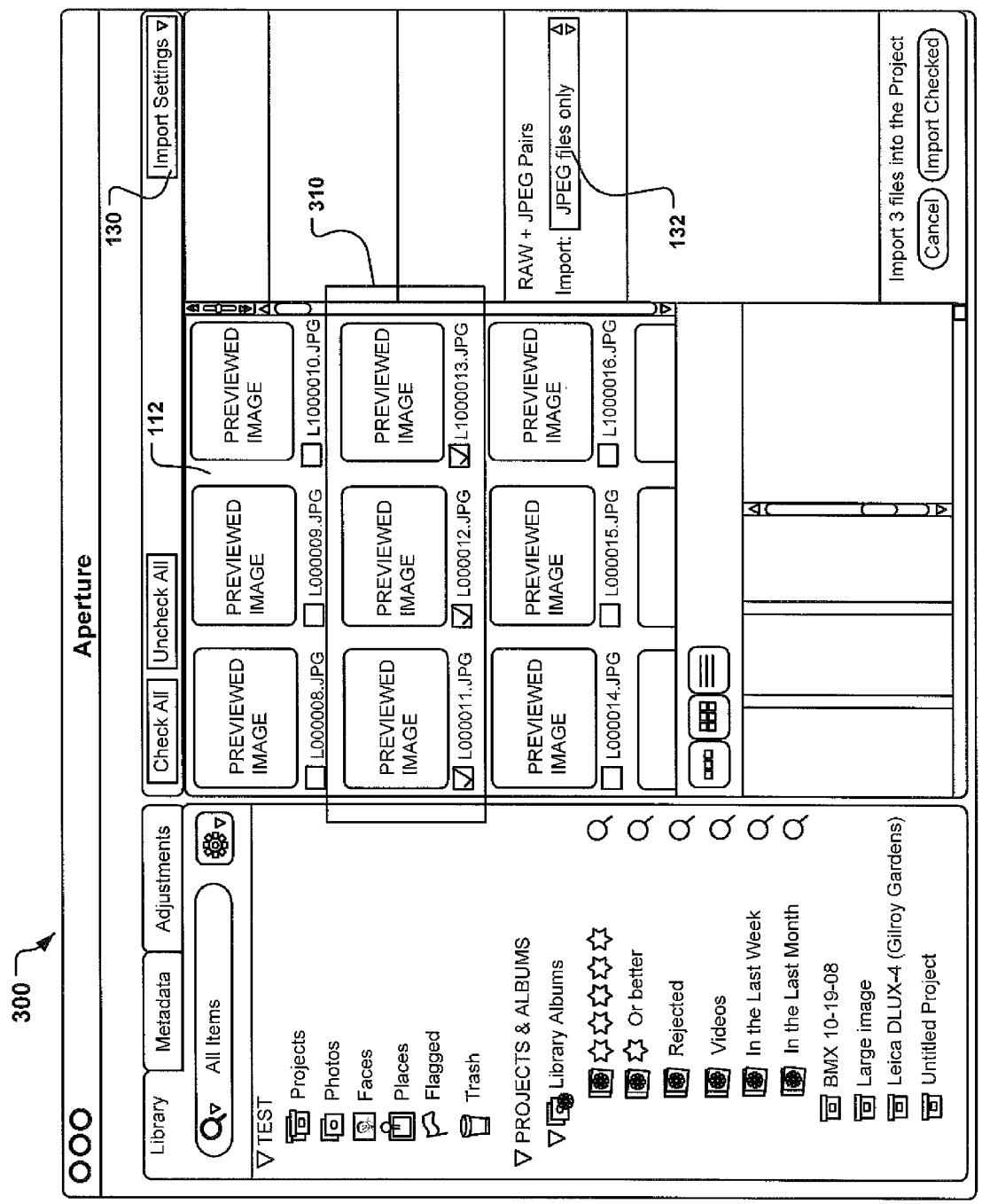
FIGS. 3A, 3B, 3C, 3D, 3E and 3F show example GUIs that illustrate a process for importing RAW+JPEG pairs.

FIG. 3A shows an example GUI (300) that can be used to import the RAW+JPEG pairs. The GUI can include a user interface to adjust the import settings (130) to import the JPEG image files first without the RAW image files (132). When the import settings (130) are adjusted to import the JPEG image files first without the corresponding RAW image files from the corresponding RAW+JPEG pairs, the available RAW image files shown in FIG. 1A above can be removed from the import view (112) automatically. Importing the JPEG image files first without the corresponding RAW image files can be useful when the user doesn't have time or adequate memory space to import all of the corresponding RAW image files. The corresponding RAW images files are much larger in size than the corresponding JPEG files and thus may need a longer wait time to import. Also, these larger sized RAW image files may need a larger available storage space to import.

In the example shown in FIG. 3A, three of the imported JPEG image files are selected (e.g., the associated boxes are checked) for import (310). The rest of the imported JPEG image files are selectively excluded. In this manner, the GUI (300) can be used to allow the user to select any of the available image files for importing the corresponding RAW image files.

Figure 3B:
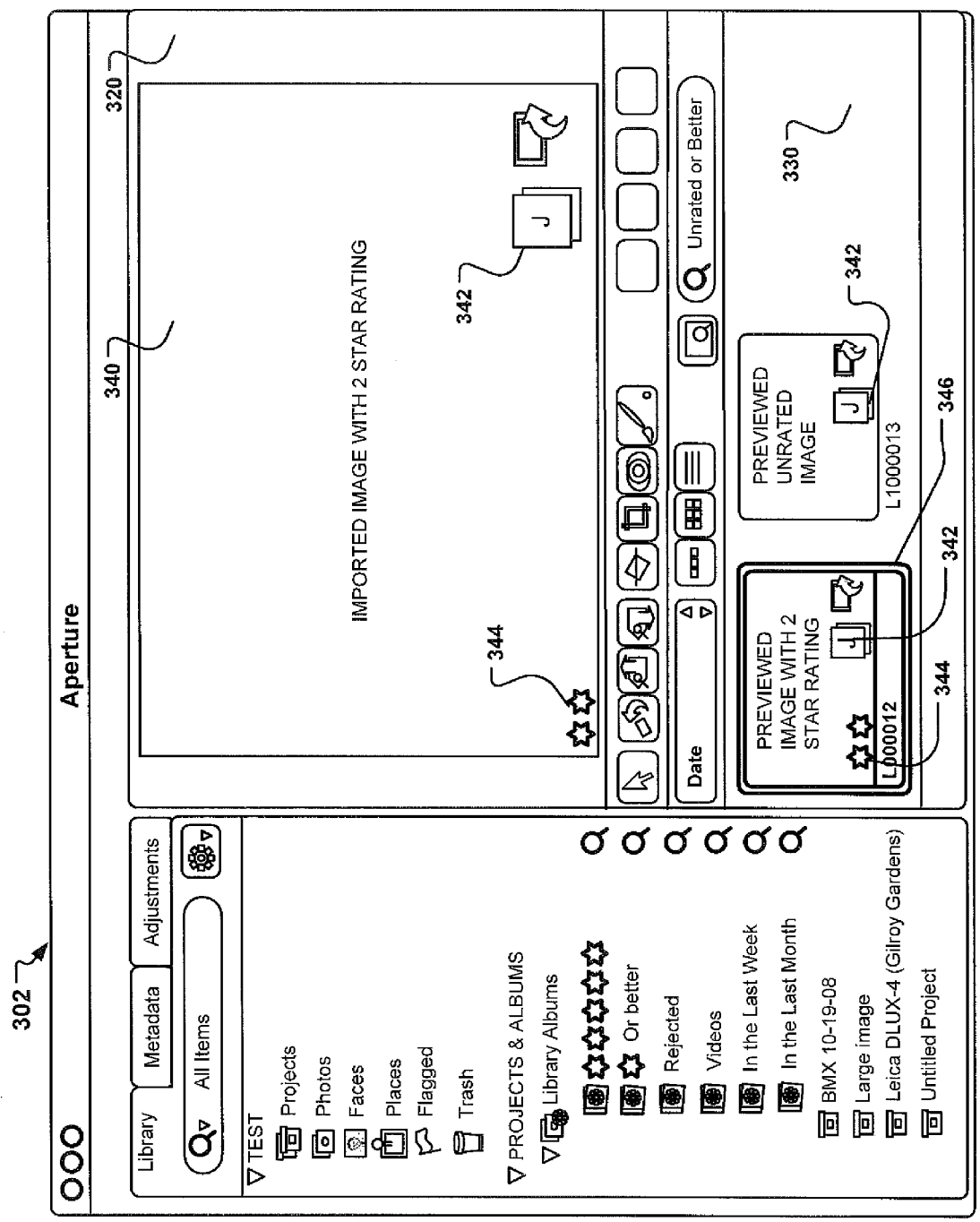

FIG. 3B shows a GUI 302 for importing and displaying the imported image files. The GUI (302) can include a main image display area (320) and an image preview area (330) for displaying the imported image files. The main image display area (320) can display one of the imported image files previewed in the image preview area (330). The imported image file (340) displayed in the main display area (330) can be displayed larger than the previewed image files. The imported image file (340) selected and displayed in the main display area (320) can be identified to the user using a visual indicator (346). In the example shown in FIG. 3B, the left-most image file in the preview area (340) is highlighted to identify the selected image file to the user.

Also, the image files displayed in the main display area (320) and the preview area (330) can also include a visual indication (342) of the file type: raw image file (e.g., RAW) or processed image file (e.g., JPEG). For example, the displayed image files can include a "J" or "R" over a portion of the displayed files to identify the image files as RAW image files or JPEG image files. Other visual indicators can be used, such as JPEG, JPG, RAW, RWL, etc. Also, the visual indicator is not limited to textual information and can include non-textual information, such as different shaped objects, different colored objects, etc.

The imported image files (the JPEG image files in the example shown in FIG. 3B) indicated and displayed as the master files can be adjusted or have metadata associated with the master files. For example, the displayed master file (e.g., JPEG image file 340) has been edited to associate user desired metadata with the master image file. In the example shown in FIG. 3B, a user indicated rating (e.g., two stars out of maximum 5 stars 344) has been associated with the JPEG image file (340) displayed. Other ratings can be used as the metadata, such as a numbered rating (e.g., a scale of 1-10 with 10 being the best rating) or color-coded ratings, for example. Moreover, the metadata applied or associated with the image files can include other non-pixel information that identifies the user generated description of the image files. The metadata associated with the image files are non-pixel information in that the images files are not processed or compressed by the metadata. Other types of metadata can include changing the spatial position of the image files, such as rotating the image files. The metadata associated with the first imported image files (e.g., the imported JPEG image files) can be used to further adjust the import settings and narrow the list of corresponding RAW image files to import.

Figure 3C:
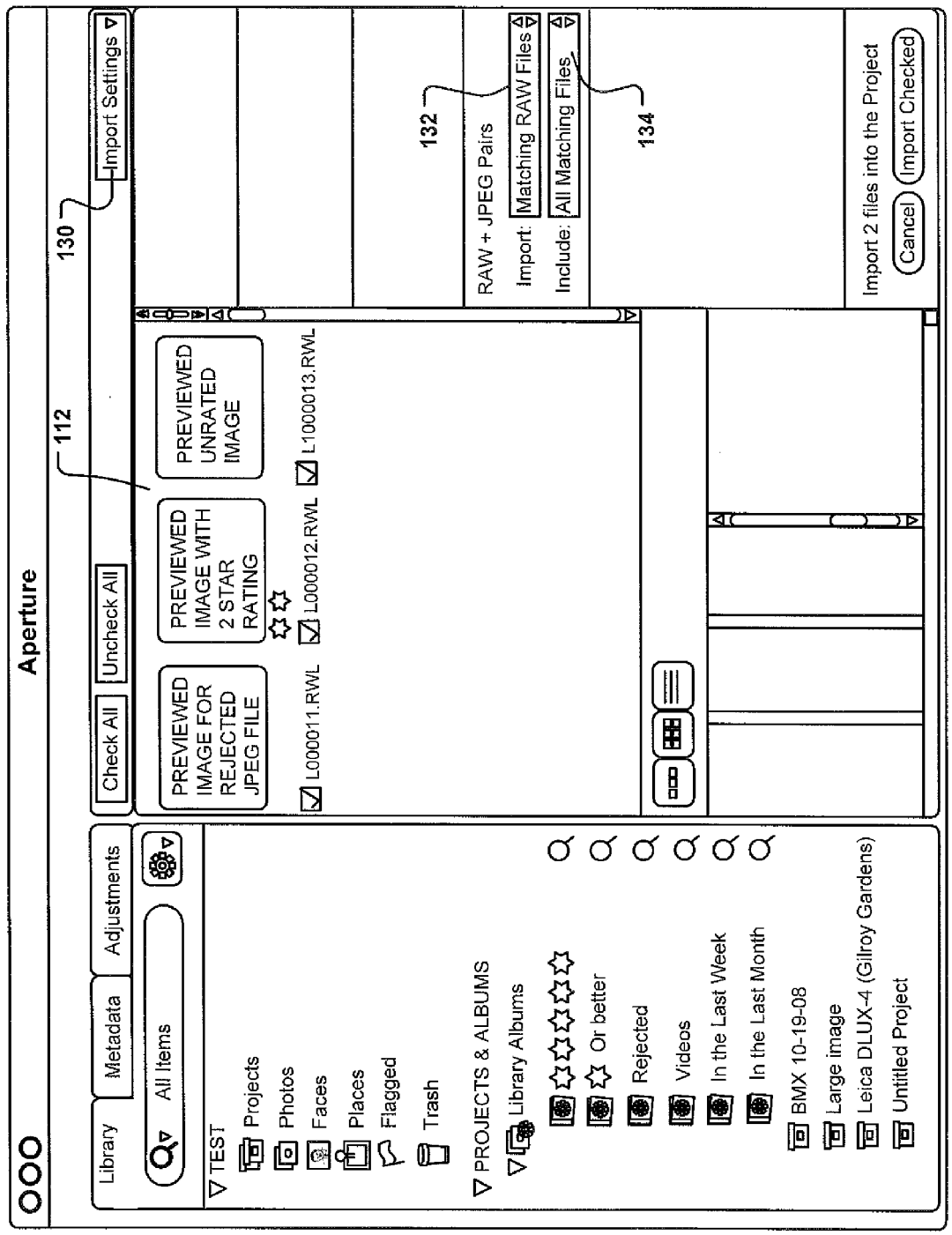

FIG. 3C shows a GUI (304) that can be used to allow the user to adjust the import settings (130). For example, after selecting the three JPEG image files in FIG. 3A, the import settings (130) can be adjusted to import a subset of the available RAW image files. The import settings (130) can include an import file-type setting (132) and an import filter setting (134). The import file-type setting (132) can be selected to import all matching or corresponding RAW image files (or JPEG files when RAW files are imported first). The import filter setting (134) can be adjusted to further narrow the list of corresponding RAW files to include all matching files. In response to the request to import all matching RAW image files including all matching files, the three RAW image files corresponding to the three imported JPEG image files are displayed in the preview area (112) of the GUI.

Figure 3D:
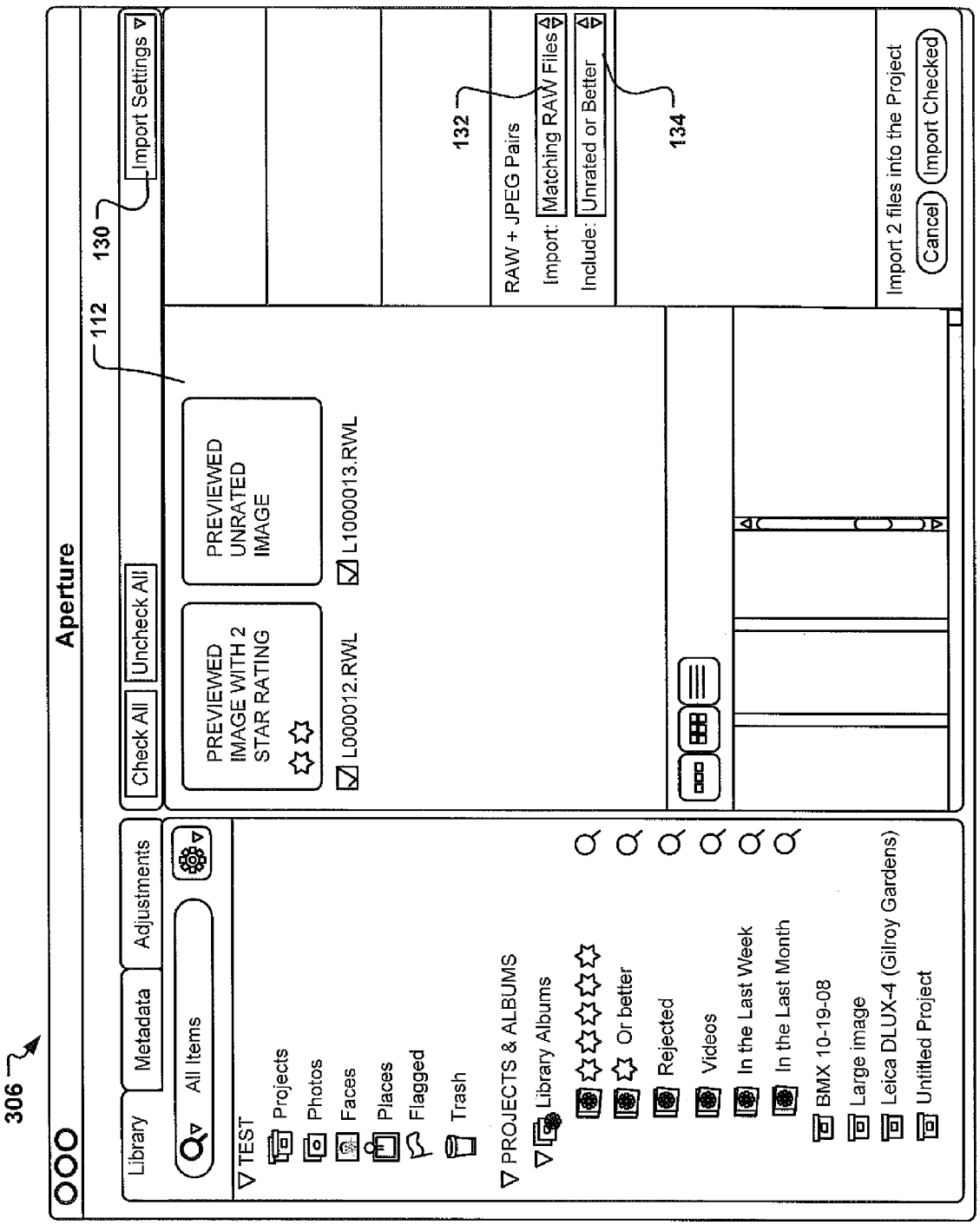

FIG. 3D shows a GUI (306) that can be used to import the RAW image files corresponding to the first imported JPEG image files using an import filter setting. The import filter setting (130) can be adjusted based on the metadata associated with the imported JPEG image files (e.g., the master image files). The GUI (306) includes an import setting (130) for selecting image files to import. The import setting (130) includes an import file type setting (132) and an import filter setting (134). In the example shown in FIG. 3D, the import file type setting (132) is set as all matching RAW image files. However, the import filter setting (134) is set to all unrated or better image files. From the three imported JPEG image files in FIG. 3A above, one was assigned a two-star rating, one was indicated as a rejected image file, and the third was unrated. Thus, in response to the import filter setting of "unrated or better," two of the corresponding RAW image files are displayed in the preview area 112. The RAW image file corresponding to the rejected JPEG image file is excluded by the above described filter setting.

Figure 3E:
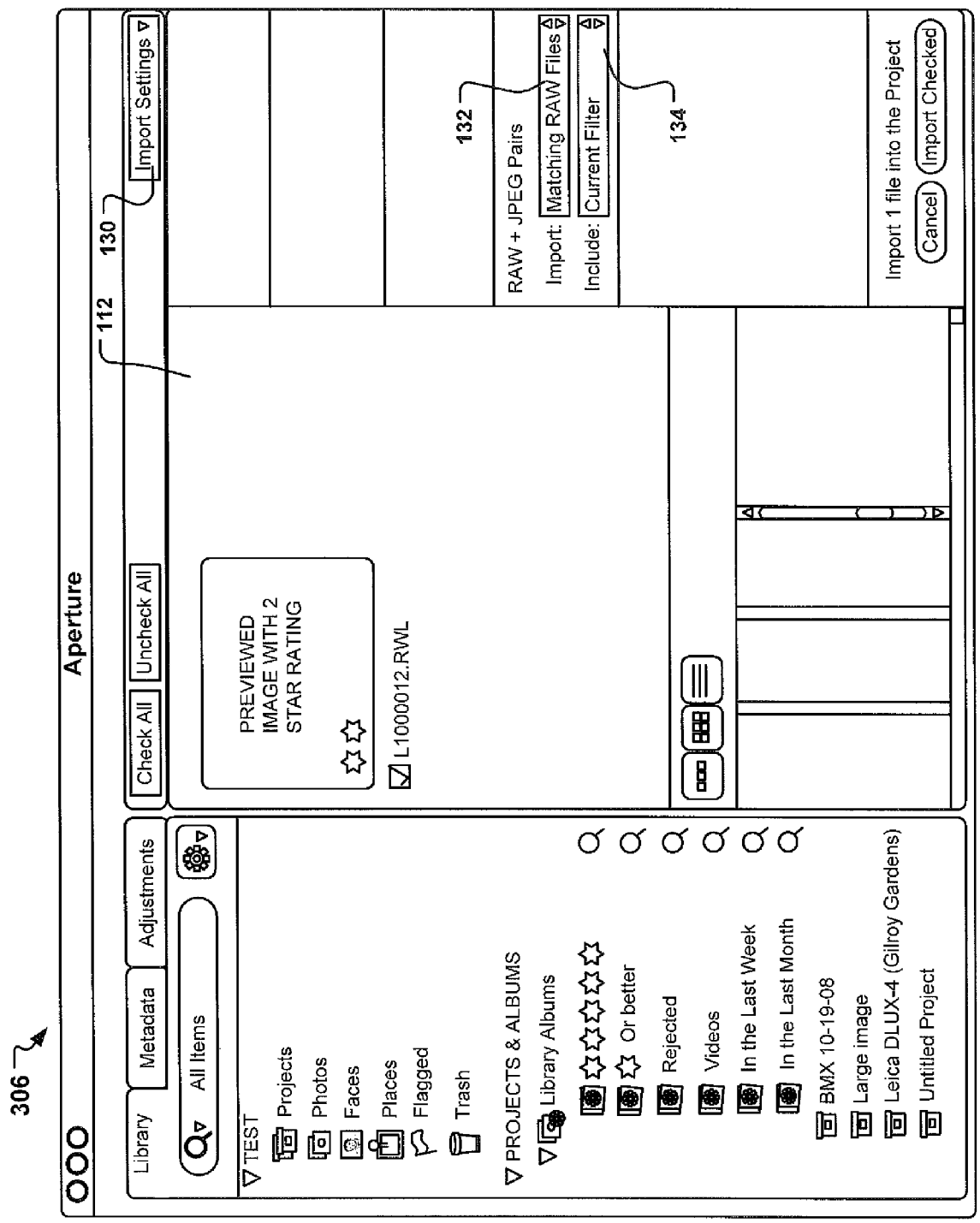

FIG. 3E shows another GUI (308) that can be used to import the RAW image files corresponding to the first imported JPEG image files using an import filter setting. The import filter setting can be adjusted based on the metadata assigned to the imported JPEG image files (e.g., the master image files). In this example, the import filter setting 134 is set as the current filter. The current filter can be set or adjusted by the user based on the metadata assigned to the JPEG image files. In the example shown in FIG. 3E, the current filter is set as a two-star rating. In response to the import filter setting of "current filter" (e.g., two-star rating), one of the RAW image files is displayed in the preview area 112. The displayed RAW image file corresponds to the imported JPEG image file with the two-star rating.

Figure 3F:
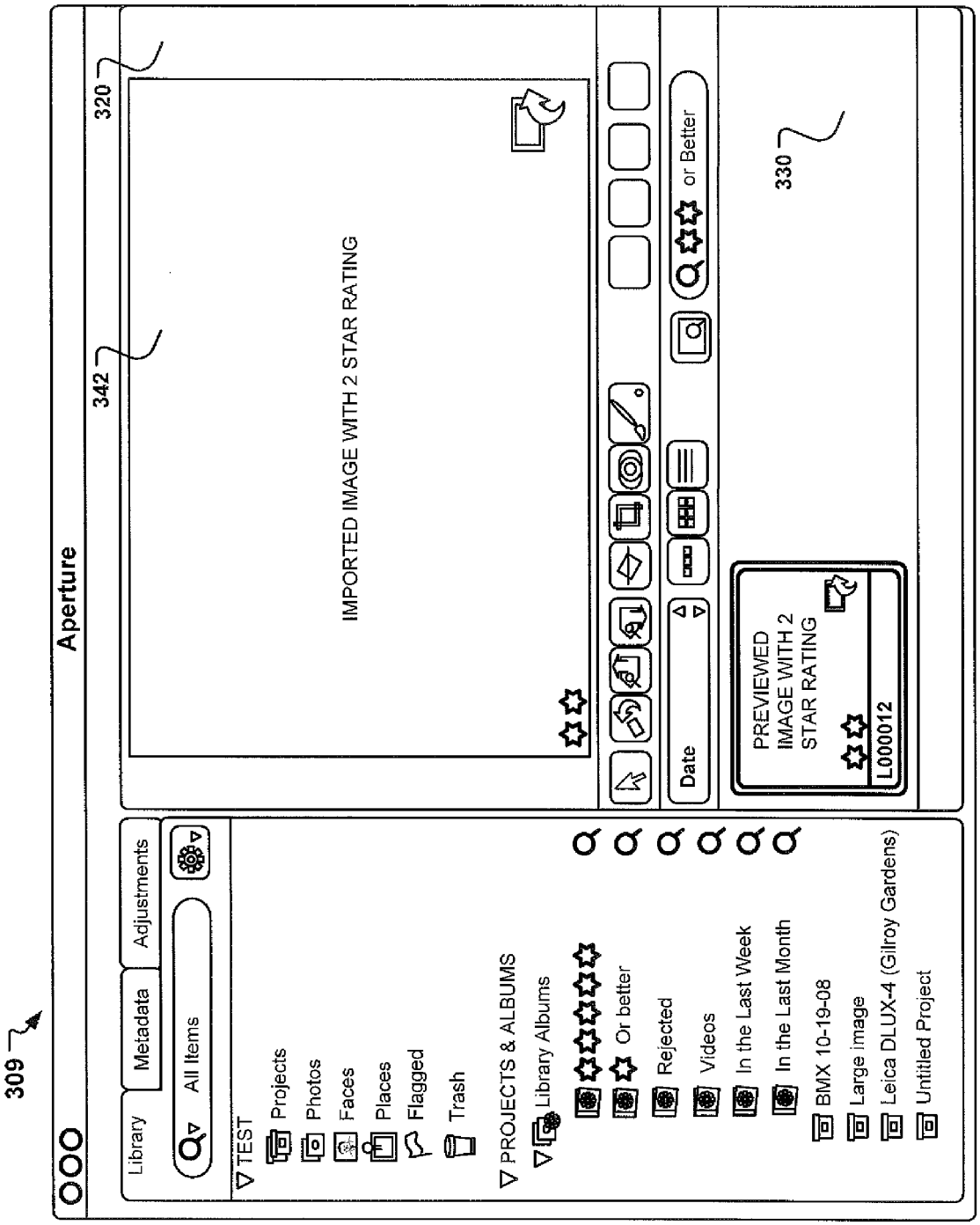

FIG. 3F shows a GUI (309) that can be used to display an image file imported using an import filter. The GUI (309) includes an image display area 320 and a preview area 330. The preview area 330 displays all of the imported image files, and the image display area 320 displays the selected one of the imported image files. In the example shown in FIG. 3F, a RAW image file 342 is imported and displayed based on the import filter set to "current filter" as described with respect to FIG. 3E above. Because only one RAW image file is imported based on the import filter, the preview area 330 displays the one imported RAW image file. The image display area 320 displays the RAW image file selected from the choice of imported image files previewed in the preview area 330.

Figure 4A:
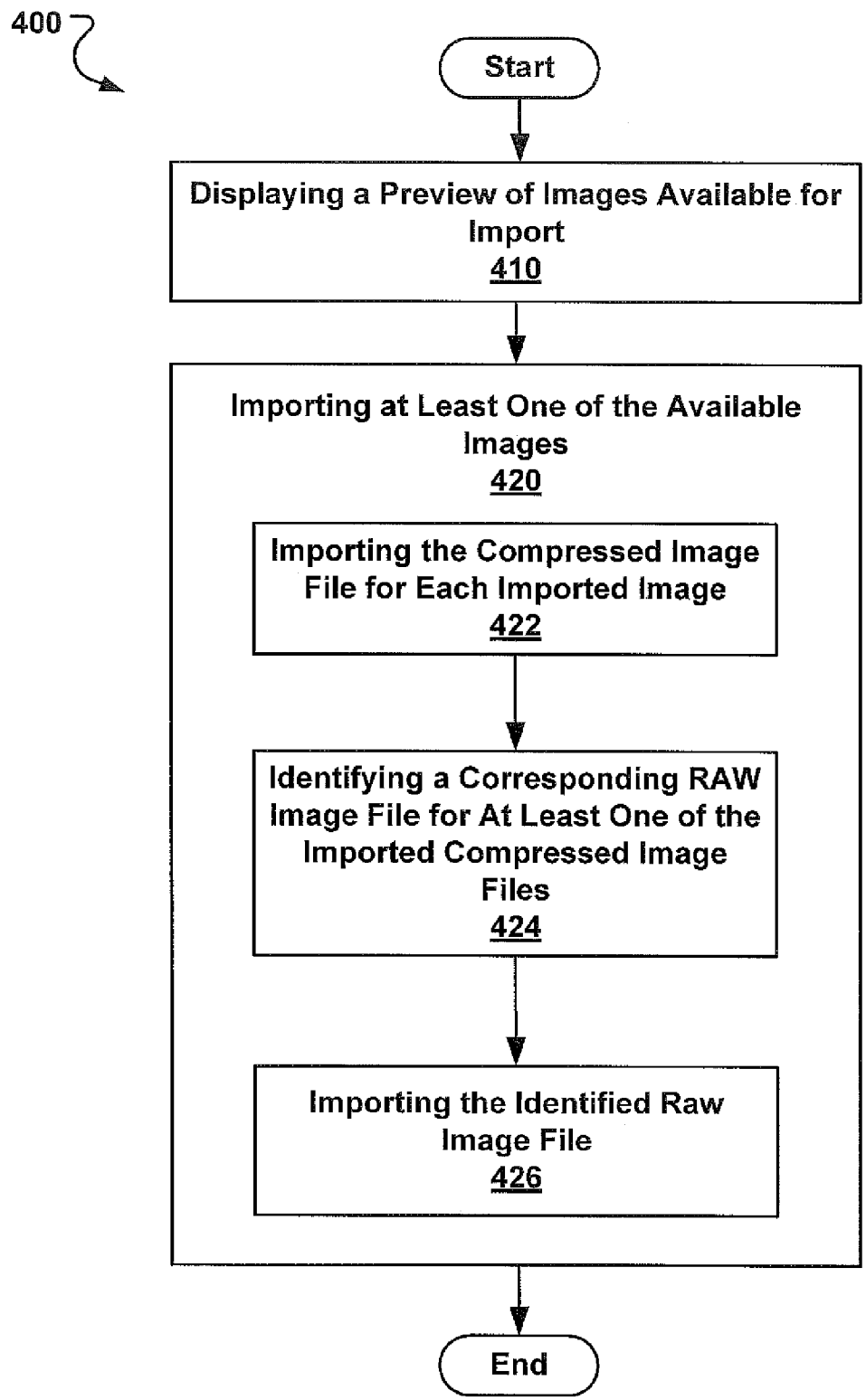
FIGS. 4A and 4B show a process for importing RAW image files corresponding to first imported JPEG image files.
Figure 4B:
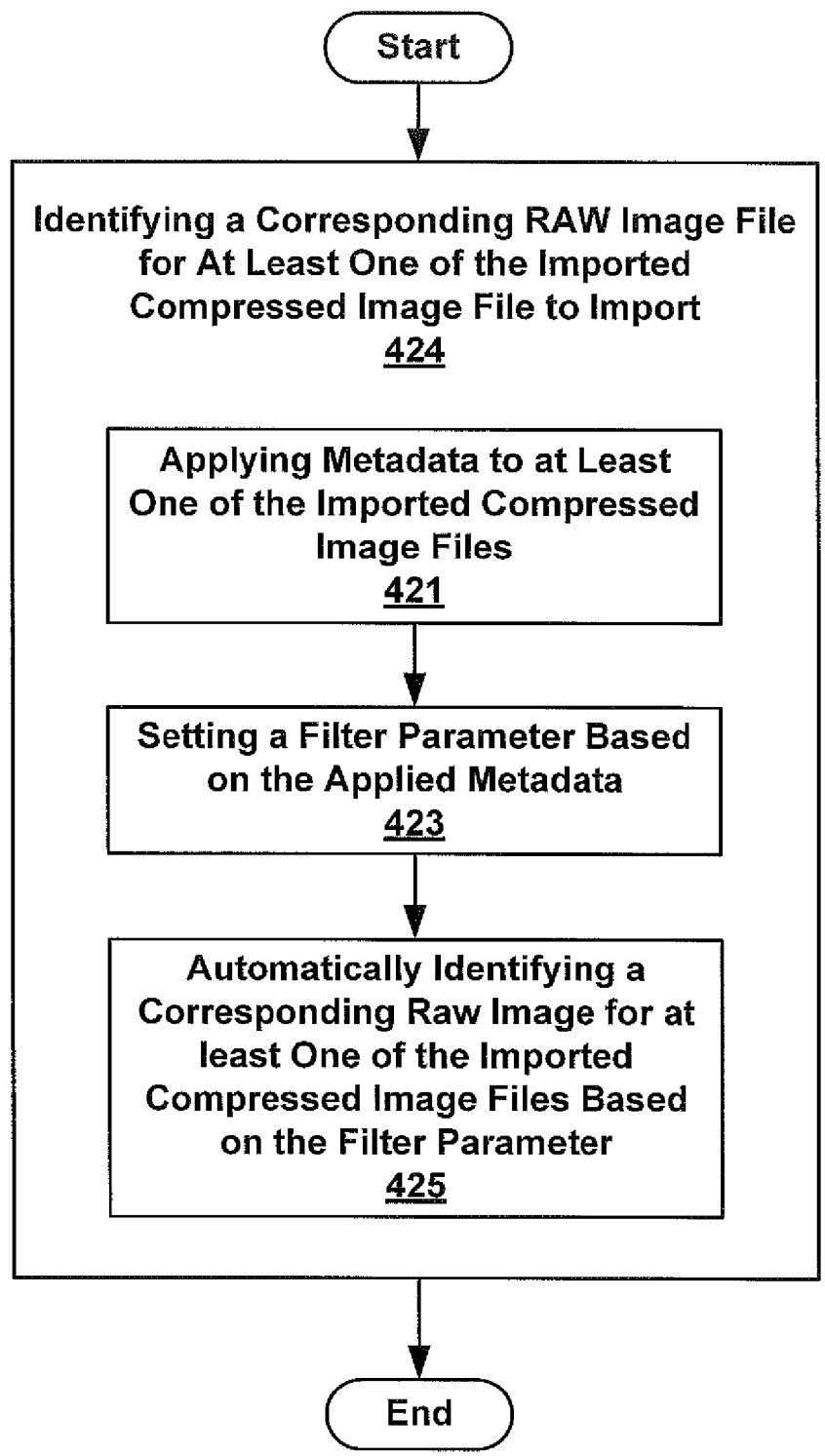

The process for importing the RAW image files corresponding to the first imported JPEG image files illustrated in FIGS. 3A-F can be described using process flow diagrams as shown in FIGS. 4A and 4B. A system or an apparatus can implement a GUI (e.g., 300, 302, 304, 306, 308 and 309) to displaying a preview of image files available for import (410). The GUI can be used to importing one or more user selected image files from the available image files (420). When importing the user selected image files, the compressed image files (e.g., JPEG image files) can be selected and imported first (422) before importing the corresponding RAW image files. A corresponding RAW image file for at least one of the first imported JPEG image files can be selected to import (424). The selected corresponding RAW image files can be imported and displayed to the user (426).

To identifying a corresponding RAW image file for at least one of the imported JPEG image files (424), metadata can be applied to at least one of the imported JPEG image files (421). Based on the applied metadata, a filter parameter can be set to selectively identify the corresponding RAW image file (423). The filter parameter can be used to import a subset of the available corresponding RAW image files.

Associating METADATA with RAW+JPEG Pair

Figure 5:
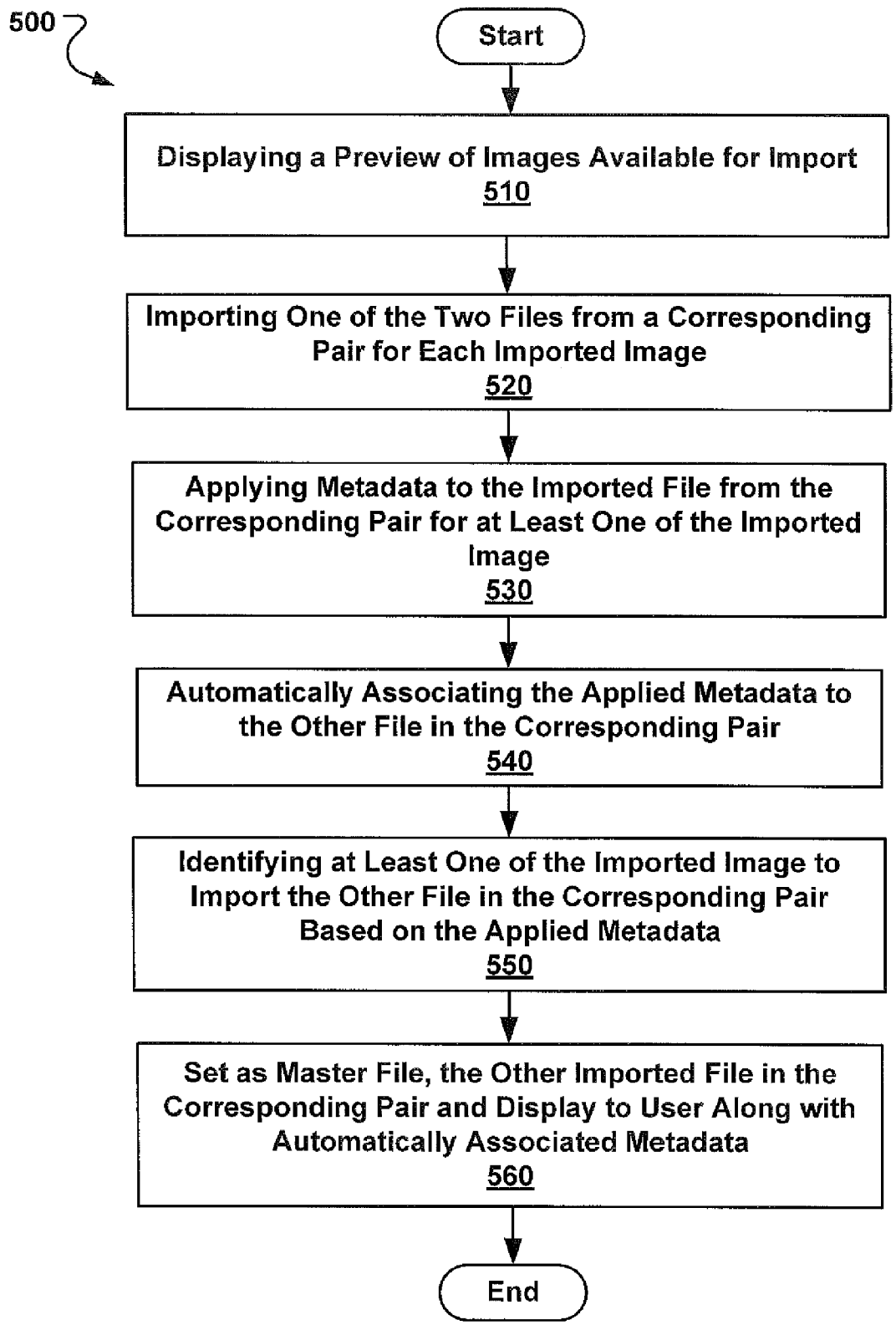
FIG. 5 is a process flow diagram showing a process for associating metadata with image files in a corresponding RAW+JPEG pair.

When assigning or associating metadata with the two linked image files in a corresponding RAW+JPEG pair, the desired metadata can be applied to the currently designated master image file only and the metadata can be automatically associated with the other image file in the corresponding pair. FIG. 5 is a process flow diagram showing a process for associating metadata with the image files in a corresponding RAW+JPEG pair. A system or apparatus can implement a GUI (e.g., 100, 102, 300, 302, 304, 306, 308 and 309) to present a preview of image files available for import from a digital camera, for example (510). The GUI can be implemented to import one of the two image files from a corresponding pair associated with a captured image (520). The imported image file is set as the master file. The GUI can be implemented to apply the user desired metadata to the imported image file (e.g., the master file) from the corresponding pair (530). The GUI can be implemented to automatically associate the applied metadata to the other image file in the corresponding pair (540).

Although the other image file in the corresponding pair has not yet been imported, the metadata can be automatically assigned to the other image file as long as the two image files are linked together. For example, if the JPEG image file from a corresponding pair is imported first and the metadata applied, the RAW image file can have the same metadata associated with it. When the other image file in the corresponding pair is selectively imported, using the import settings for example (550), the imported other image file in the corresponding pair can be set as the master file and displayed to the user along with the associated metadata (560). However, because the other image file in the corresponding pair need not be imported, the associated metadata on the other image file may not be visible to the user until imported and displayed.

The metadata can be applied to the two image files in the corresponding par using a single metadata file that includes the applied metadata. The metadata file can be generated and point to the two image files in the corresponding pair. The image file selected as the master file is displayed to the user along with the applied metadata. The metadata applied to the image files can include user rating, caption, GPS coordinate, sharpness, white balance, etc. Thus, Metadata can include any data about that captured image except for any modification to the pixels.

When the two image files are not linked together but rather separated as separate master files, the metadata applied to one image file is not automatically associated with the other image file in the corresponding pair. In this example, two different metadata files are implemented with each pointing to a separate master image file.

In addition, the GUI can be implemented to import both image files rather than just one of the corresponding pair. As described above with respect to FIGS. 1A, 1B and 2, both image files in a corresponding pair can be imported together with one image file (e.g., RAW or JPEG) designated as the master file. When the metadata is applied to the master image file (e.g., the image file displayed to the user), the metadata can be automatically associated with the other image file in the corresponding pair. The associated metadata can be presented to the user when the master image file is switched to the other image file. For example, the GUI can be implemented to import both image files with the JPEG image file designated as the master image file. The GUI can be implemented to assign a two-star rating to the master image file (e.g., the displayed JPEG image file). Then the two-star rating can be automatically associated with the not yet displayed RAW image file. Because the metadata is automatically associated with the corresponding RAW image file, the GUI can be used to adjust the import filter settings to eliminate some of the RAW image files based on the associated metadata. Also, when the RAW image file is set as the master image file, the associated metadata can be displayed to the user along with the RAW image file.

Associating Adjustments to RAW+JPEG Pair

Figure 6:
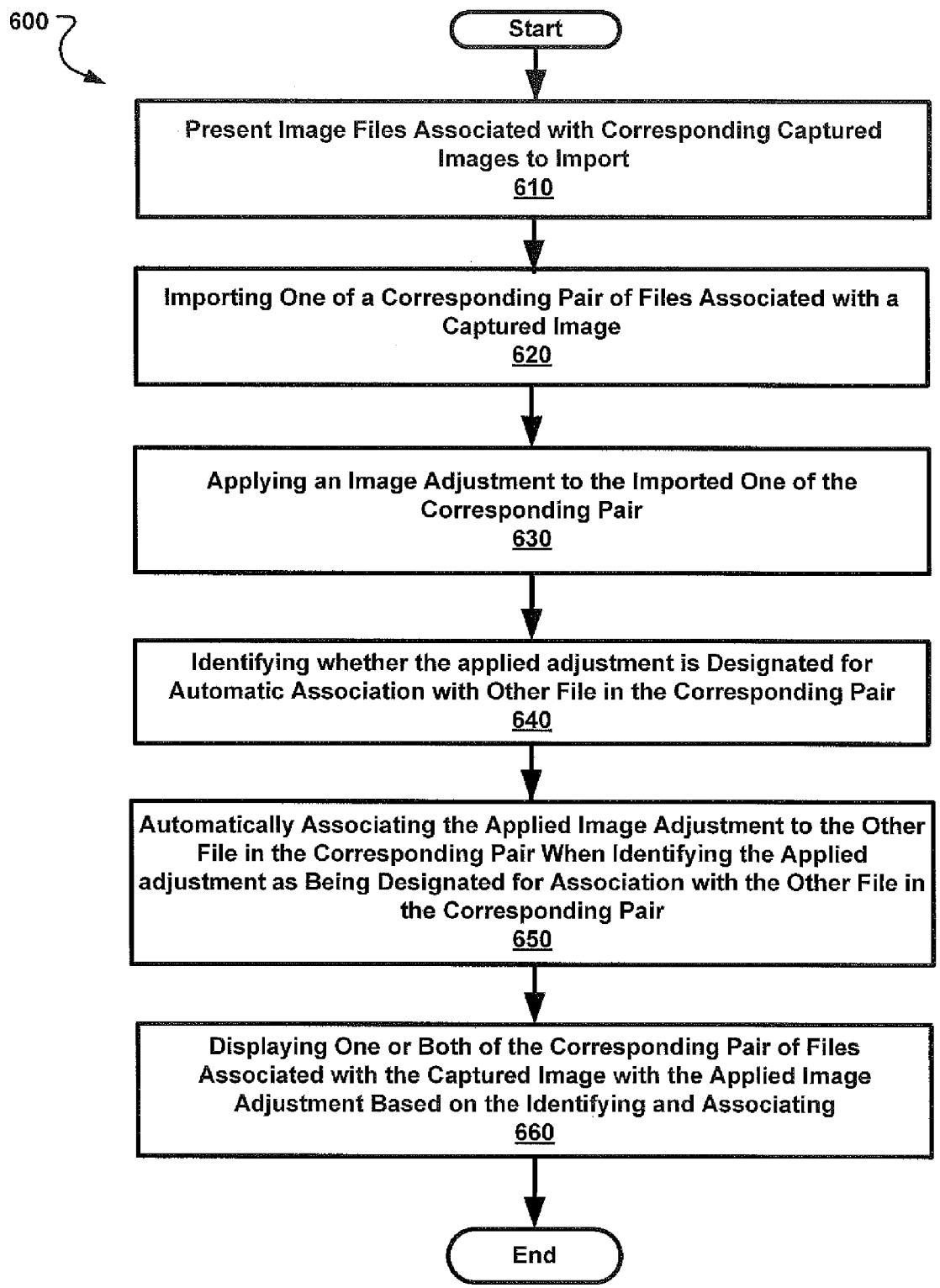
FIG. 6 is a process flow diagram showing a process for associating image adjustments to a RAW+JPEG pair.

In addition to associating metadata to the RAW+JPEG pair, different image adjustments can be applied. FIG. 6 is a process flow diagram showing a process for associating image adjustments to a RAW+JPEG pair. A system or apparatus can implement a GUI (e.g., 100, 102, 300, 302, 304, 306, 308 and 309) to present image files available for import (610). The GUI can be implemented to import one of the two image files from a corresponding pair associated with a captured Image (620). The GUI can be implemented to apply an image adjustment to the imported one of the corresponding Pair (630). The system or the apparatus can identify whether the applied adjustment is designated for automatic association with the other image file in the corresponding pair (640). Even if the two image files are linked together, it may not be desirable to automatically associate all image adjustments to both image files in the corresponding pair. The different types of image adjustments are described further below. The GUI can be implemented to automatically associate the applied image adjustment to the other image file in the corresponding pair when the applied adjustment is identified as being designated for association with both files in the corresponding pair (650). The GUI can be implemented to display the JPEG or RAW or both image files from the corresponding pair associated with the captured image along with the applied image adjustment based on the identifying and associating (660). The image adjustment is displayed with the selected master image file. For example, when the JPEG image file is displayed as the master file, the applied image adjustment is shown with the displayed JPEG image file. When the RAW image file is displayed as the master file, the applied image adjustment is shown with the displayed RAW image file.

Examples of image adjustments can include crop, flip and straighten that can be designated for association with both JPEG and RAW image files. Examples of the image adjustments that may not be automatically associated with both the JPEG and RAW image files can include tone and white balance. The different treatment of different image adjustment can be attributed to the desire to process the JPEG image file differently from the RAW image file. For example, the JPEG image file may be white balanced differently than the RAW image file.

Also, the JPEG and RAW image files may have different height and width information. Thus, when applying the different image adjustment to the JPEG and RAW image files, these differences in the height and width of the image files can be compensated using a corrective relative spatial location determination. For example, when the color of a jacket worn by a person in the JPEG image file is adjusted, the pixel location of the jacket can be different in the RAW image file. Thus, the relative location of the jacket with respect to a reference point can be calculated in the JPEG image file and extrapolated onto the RAW image file. For example, the jacket location can be calculated from the center of the JPEG image or from the edges of the JPEG image or both. Other spatial corrective techniques can be used to determine the correct location of the image adjustment.

The user may be presented with the control over which image adjustments carry over to both the JPEG and RAW image files. Also, the applied adjustments are removable or non-destructive. Rather than directly modifying the pixel information of the image files, a record or file can be generated with the desired image adjustment information. The record with the desired image adjustment is associated with the corresponding image files, such that when either or both image files are displayed, the image adjustment information from the image adjustment file is used to apply the image adjustment to the displayed image(s).

In addition, the GUI can be implemented to import both image files from the corresponding pair rather than just one. As described above with respect to FIGS. 1A, 1B and 2, both image files in a corresponding pair can be imported together with one image file (e.g., RAW or JPEG) designated as the master file. When the image adjustment is applied to the master image file (e.g., the image file displayed to the user), the image adjustment can be automatically associated with the other image file in the corresponding pair based on whether the image adjustment should carry over to both image files.

Figure 7:
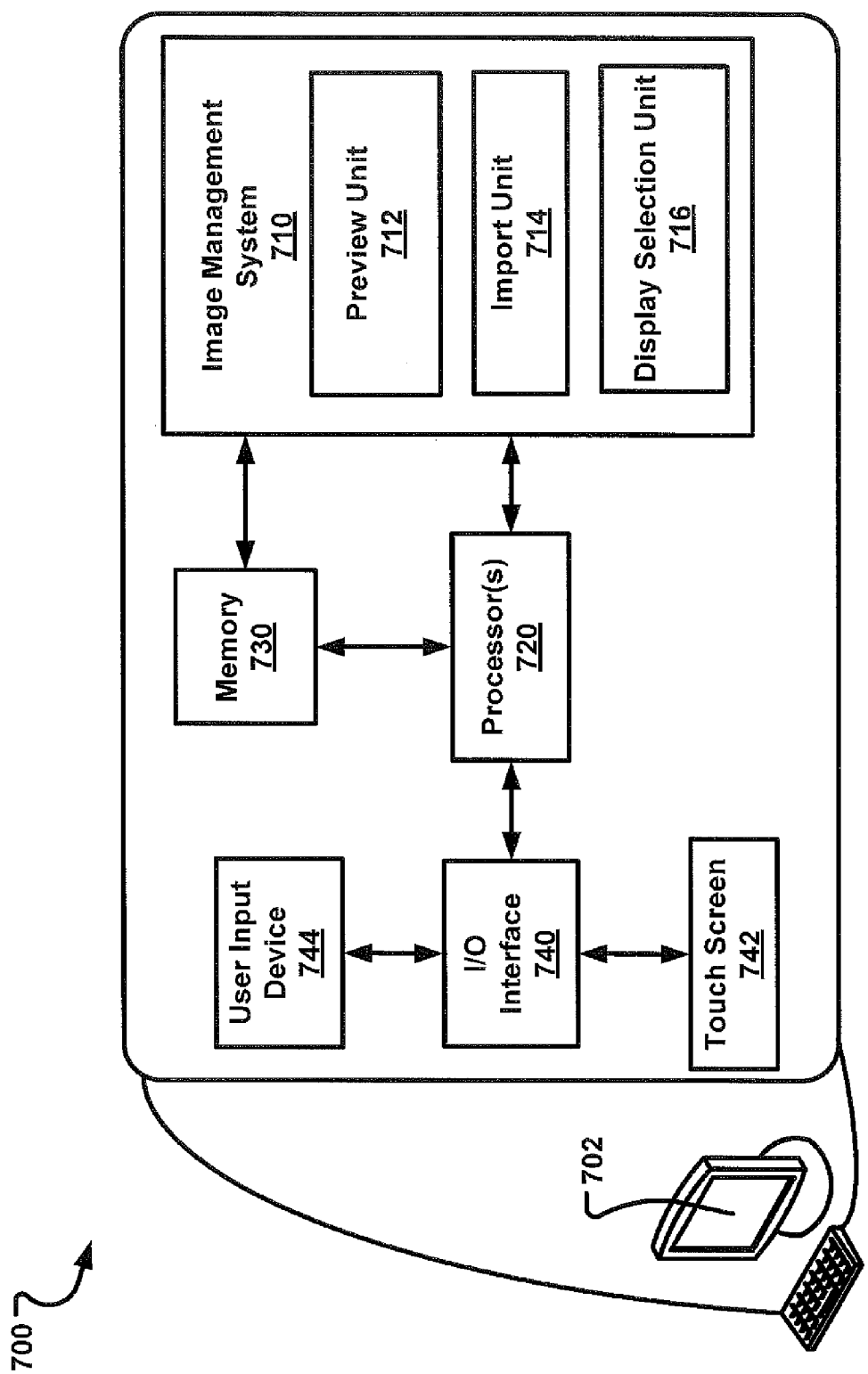
FIG. 7 is a block diagram of a computing device and system that can be used to implement techniques described with respect to FIGS. 1A-1B, 3A-3E, 4, 5 and 6.

FIG. 7 is a block diagram of a computing device and system (700) that can be used to implement the techniques described with respect to FIGS. 1A-1B, 3A-3E, 4, 5 and 6. The system (700) can include a processor (720) to control operation of the system (700) including executing any machine or computer readable instructions. The processor (720) can communicate with a memory or data storage unit (730) that can store data, such as image files and machine or computer readable instructions. Also, the processor (720) can communicate with an image management system (710) to manage different image files including import, export, storage, image adjustment, metadata application and display of the image files. The processor (720) can communicate with an input/output (I/O) interface (740) that can interface with different input devices, output devices or both. For example, the I/O interface (740) can interface with a touch screen (742) on a display device (702). Also, the I/O interface (740) can interface with a user input device (744) such as a keyboard, a mouse, a trackball, etc. that are designed to receive input form a user.

Figure 8:
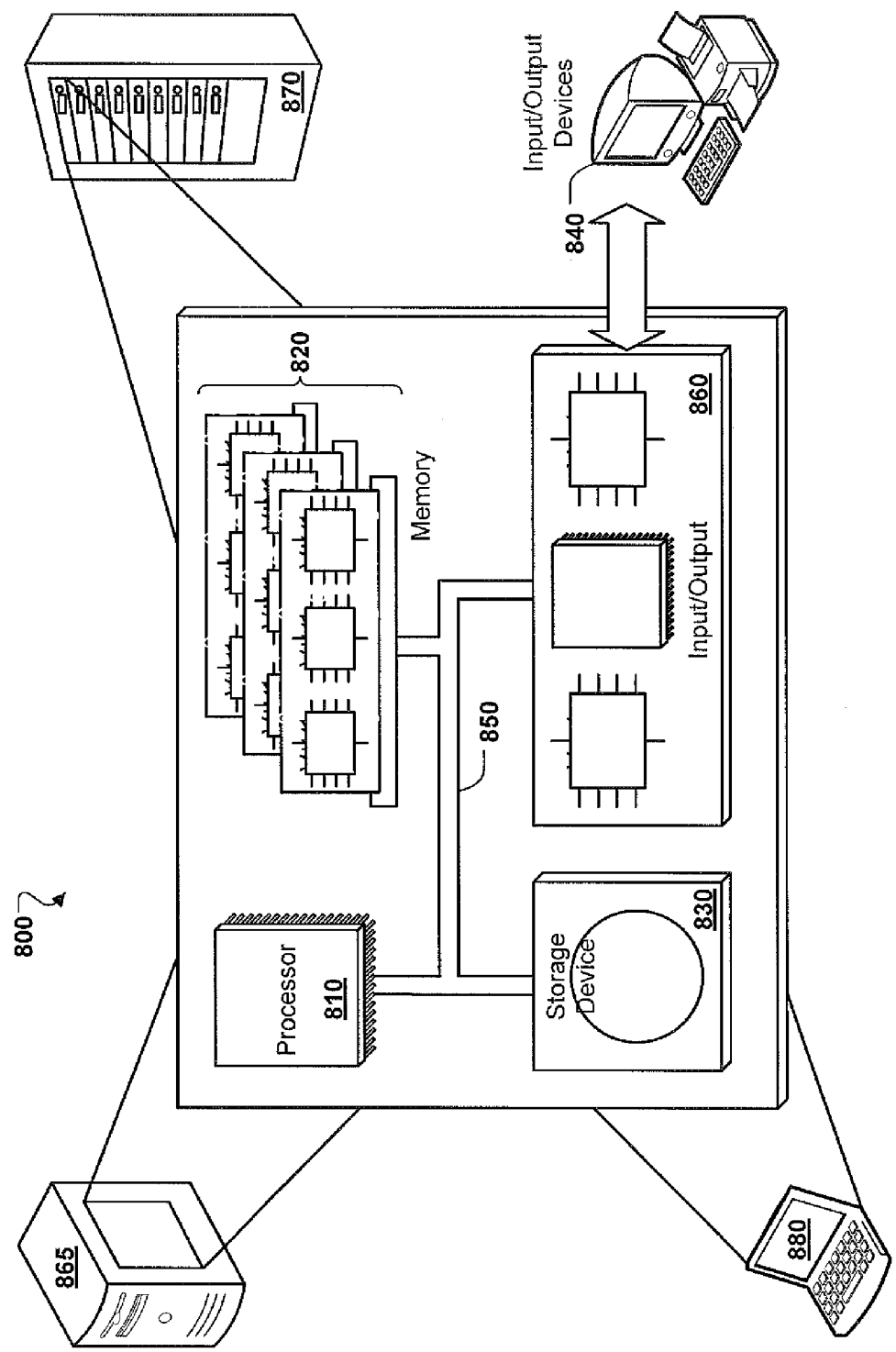
FIG. 8 is a block diagram of another computing device and system that can be used, e.g., to manage RAW+JPEG pairs as described with respect to FIGS. 1A-1B, 3A-3E, 4, 5 and 6.

FIG. 8 is a block diagram of another computing device and system that can be used, e.g., to manage RAW+JPEG pairs as described with respect to FIGS. 1A-1B, 3A-3E, 4, 5 and 6. Computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 800 includes a processor 810, memory 820, a storage device 830, a high-speed interface 850 connecting to memory 820. The computing device can also include high-speed expansion ports (not shown), and a low speed interface (not shown) connecting to low speed bus (not shown) and storage device 830. Each of the components 810, 820, 830, 850, and 820, are interconnected using various busses, and can be mounted on a common motherboard or in other manners as appropriate. The processor 810 can process instructions for execution within the computing device 800, including instructions stored in the memory 820 or on the storage device 830 to display graphical information for a GUI on an external input/output device, such as display 840 coupled to an input/output interface 860. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

The memory 820 stores information within the computing device 800. In one implementation, the memory 820 is a computer-readable medium. In one implementation, the memory 820 is a volatile memory unit or units. In another implementation, the memory 820 is a non-volatile memory unit or units.

The storage device 830 is capable of providing mass storage for the computing device 800. In one implementation, the storage device 830 is a computer-readable medium. In various different implementations, the storage device 830 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 820, the storage device 830, memory on processor 810, or a propagated signal.

The high speed controller 850 manages bandwidth-intensive operations for the computing device 800, while the low speed controller manages lower bandwidth-intensive operations. Such allocation of duties is exemplary only. In one implementation, the high-speed controller 850 is coupled to memory 820, display 840 (e.g., through a graphics processor or accelerator), and to high-speed expansion ports (not shown), which can accept various expansion cards (not shown). In the implementation, low-speed controller (not shown) is coupled to storage device 830 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 865, or multiple times in a group of such servers. It can also be implemented as part of a rack server system 870. In addition, it can be implemented in a personal computer such as a laptop computer 880.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. For example, the GUIs 100, 102, 300, 302, 304, 306, 308 and 309 may be implemented as the same GUI or as separate GUIs. Also, any number of the GUIs can be implemented together.

What is claimed is:

1. A non-transitory computer-readable medium storing instructions executable by a data processing device to perform operations comprising:
    identifying a preview of images available for import, wherein an image is associated with a pair of image files obtained from a single image capture, the pair of image files comprising a raw image file and a compressed image file generated by compressing the raw image file, wherein the raw image file and the compressed image file are linked, wherein the raw image file includes substantially all pixel information about the image and the compressed image file includes substantially less pixel information compared to the raw image file;
    importing both the raw image file and the compressed image file of the pair of image files associated with the image;
    receiving input identifying one of the pair of corresponding image files as a master image file for the image; and
    displaying the identified master image file for the image.

2. The medium of claim 1, wherein receiving input identifying one of the pair of image files as the master file for the image comprises detecting that the raw image file and the compressed image file together for the image are docked together as linked image files.

3. The medium of claim 1, the operations further comprising:
    detecting a selection of the image; and
    displaying the image to be visually different from remaining unselected images in response to detecting the selection.

4. A system comprising:
    a data processing device; and
    a computer-readable medium storing instructions executable by the data processing device to perform operations comprising:
        identifying a preview of images available for import, wherein an image is associated with a pair of image files obtained from a single image capture, the pair of image files comprising a raw image file and a compressed image file generated by compressing the raw image file, wherein the raw image file and the compressed image file are linked, wherein the raw image file includes substantially all pixel information about the image and the compressed image file includes substantially less pixel information compared to the raw image file;
        importing both the raw image file and the compressed image file of the pair of image files associated with the image;
        receiving input identifying one of the pair of corresponding image files as a master image file for the image; and
        displaying the identified master image file for the image.

5. The system of claim 4, wherein receiving input identifying one of the pair of image files as the master file for the image comprises detecting that the raw image file and the compressed image file together for the image are docked together as linked image files.

6. The system of claim 4, the operations further comprising:
    detecting a selection of the image; and
    displaying the image to be visually different from remaining unselected images in response to detecting the selection.

7. A non-transitory computer-readable medium storing instructions executable by data processing apparatus to perform operations comprising:
    identifying a preview of images available for import, wherein an image is associated with a pair of image files obtained from a single image capture, the pair of image files comprising a raw image file and a compressed image file generated by compressing the raw image file, wherein the raw image file includes substantially all pixel information about the image and the compressed image file includes substantially less pixel information compared to the raw image file, wherein the raw image file and the compressed image file are linked;

importing the pair of image files including both the compressed image file of the pair of image files;

receiving input adjusting an import setting to identify one of the pair of corresponding image files as the raw image file; and importing the raw image file based on the adjusted import setting.

8. The medium of claim 7, the operations further comprising:

applying metadata to the imported compressed image file, wherein the input adjusting the import setting comprises an adjustment to a filter parameter based on the applied metadata; and automatically identifying the raw image file based on the filter parameter.

9. The medium of claim 8, wherein applying the metadata comprises:

creating a metadata file containing the metadata; and pointing the metadata file to the compressed image file and the raw image file.

10. The medium of claim 7, wherein the metadata includes at least one of non-pixel information related to at least one of caption, global positioning satellite (GPS) coordinate, sharpness or white balance, or a rating to the imported compressed image file.

11. A system comprising:

a data processing device; and a computer-readable medium storing instructions executable by data processing apparatus to perform operations comprising:

identifying a preview of images available for import, wherein an image is associated with a pair of image files obtained from a single image capture, the pair of image files comprising a raw image file and a compressed image file generated by compressing the raw image file, wherein the raw image file and the compressed image file are linked, wherein the raw image file includes substantially all pixel information about the image and the compressed image file includes substantially less pixel information compared to the raw image file;

importing both the compressed image file of the pair of image files for the image;

receiving input adjusting an import setting to identify the raw image file for the imported compressed image file; and importing the corresponding raw image file based on the adjusted import setting.

12. The system of claim 11, the operations further comprising:

applying metadata to the imported compressed image file, wherein the input adjusting the import setting comprises an adjustment to a filter parameter based on the applied metadata; and automatically identifying the raw image file that corresponds to the imported compressed image file based on the filter parameter.

13. The system of claim 12, wherein applying the metadata comprises:

creating a metadata file containing the metadata; and pointing the metadata file to the compressed image file and the raw image file.

14. The system of claim 12, wherein the metadata includes a rating to the imported compressed image file, and wherein automatically identifying the raw image file that corresponds to the imported compressed image file based on the filter parameter comprises:

searching for raw image files that meet the applied rating; and importing the corresponding raw image files that meet the applied rating.

15. A non-transitory computer-readable medium storing instructions executable by data processing apparatus to perform operations comprising:

importing one of a pair of image files associated with a captured image, wherein the image file pair comprises a compressed image file and a raw image file;

receiving input applying an image adjustment to the imported one of the corresponding pair;

identifying whether the applied adjustment is designated for association with both the compressed image file and the raw image file in the image file pair;

associating the applied image adjustment to the other file in the image file pair when identifying the applied adjustment as being designated for association with both the compressed image file and the raw image file in the image file pair; and displaying one or both of the compressed image file and the raw image file in the image file pair associated with the captured image with the applied image adjustment based on the identifying and associating.

16. The medium of claim 15, the operations further comprising:

detecting a selection of the one of the pair of image files; and in response to detecting the selection, displaying the one of the pair of image files to be visually different from remaining unselected image files to visually indicate the selection.

17. The medium of claim 15, wherein identifying the applied image adjustment as being designated for association with both the compressed image file and the raw image comprises:

identifying the applied image adjustment as matching one of available image adjustments designated to be applied to both the compressed image file and the raw image file; and applying an image adjustment of the available image adjustments.

18. The medium of claim 15, wherein identifying the applied image adjustment as being designated for association with both the compressed image file and the raw image comprises identifying the applied image adjustment as not matching one of available image adjustments not designated to be applied to both the compressed image file and the raw image file, wherein the available image adjustments not designated to be applied to both the compressed image file and the raw image file comprises at least one of tone or white balance.

19. A system comprising:

a data processing device; and a computer-readable medium storing instructions executable by data processing apparatus to perform operations comprising:

importing one of a pair of image files associated with a captured image, wherein the image file pair comprises a compressed image file and a raw image file;

receiving input applying an image adjustment to the imported one of the corresponding pair;

identifying whether the applied adjustment is designated for association with both the compressed image file and the raw image file in the image file pair;

associating the applied image adjustment to the other file in the image file pair when identifying the applied adjustment as being designated for association with both the compressed image file and the raw image file in the image file pair; and displaying one or both of the compressed image file and the raw image file in the image file pair associated with the captured image with the applied image adjustment based on the identifying and associating.

20. The system of claim 19, the operations further comprising:

detecting a selection of the one of the pair of image files; and in response to detecting the selection, displaying the one of the pair of image files to be visually different from remaining unselected image files to visually indicate the selection.

21. The system of claim 19, wherein identifying the applied image adjustment as being designated for association with both the compressed image file and the raw image comprises:

identifying the applied image adjustment as matching one of available image adjustments designated to be applied to both the compressed image file and the raw image file; and applying an image adjustment of the available image adjustments.

22. The system of claim 18, wherein identifying the applied image adjustment as being designated for association with both the compressed image file and the raw image comprises identifying the applied image adjustment as not matching one of available image adjustments not designated to be applied to both the compressed image file and the raw image file, wherein the available image adjustments not designated to be applied to both the compressed image file and the raw image file comprises at least one of tone or white balance.

* * * * *

UNITED STATES PATENT AND TRADEMARK OFFICE
CERTIFICATE OF CORRECTION

PATENT NO. : 9,582,902 B2  
APPLICATION NO. : 14/146847  
DATED : February 28, 2017  
INVENTOR(S) : Nikhil Bhatt et al.

Page 1 of 1

It is certified that error appears in the above-identified patent and that said Letters Patent is hereby corrected as shown below:

In the Claims

Column 20, Line 11, Claim 22, replace "system" with -- medium --.

Signed and Sealed this
Tenth Day of July, 2018

Andrei Iancu
*Director of the United States Patent and Trademark Office*